United States Patent [19]

Desbiolles et al.

[11] Patent Number: 5,171,621
[45] Date of Patent: Dec. 15, 1992

[54] PRODUCT HAVING ALVEOLI, SEMI-FINISHED PRODUCT THEREFOR AND METHOD OF MAKING THE PRODUCTS

[75] Inventors: Jack Desbiolles; Denis Gasquet, both of Annecy, France

[73] Assignee: Taylor Made Golf Company, Inc., Carlsbad, Calif.

[21] Appl. No.: 480,602

[22] Filed: Feb. 15, 1990

[30] Foreign Application Priority Data

Feb. 15, 1989 [FR] France ............................. 89 01975

[51] Int. Cl.$^5$ .......................... B32B 3/00; A63B 53/02
[52] U.S. Cl. ...................................... 428/141; 428/120;
428/156; 428/167; 273/81 R; 273/81 B;
273/81.6; 273/167 R; 273/167 D; 273/167 E;
273/193 R; 273/175
[58] Field of Search ...................... 428/156, 167, 542.8,
428/141, 119, 120, 131, 134, 192; 29/121.1;
273/193 R, 194 A, 232, 81 R, 81 B, 167 R, 175,
167 C, 167 D, 167 F, 167 E, 81.6; D8/DIG. 6

[56] References Cited

U.S. PATENT DOCUMENTS

| | | | |
|---|---|---|---|
| 1,695,476 | 12/1928 | Winkler | 51/289 S |
| 3,640,028 | 2/1972 | Richard | 51/289 S |
| 4,650,708 | 3/1987 | Takahashi | 428/216 |

Primary Examiner—Donald J. Loney
Attorney, Agent, or Firm—Sandler, Greenblum & Bernstein

[57] ABSTRACT

A method of making a finished product, a semi-finished product for making the finished product, as well as the products made thereby. The semi-finished product includes at least one surface having a plurality of recesses, or alveoli, therein, in which the method includes determining a depth of material to be removed from the surface during a finishing process, and forming each of the plurality of recesses in the surface to have a substantially cylindrical section which extends for a predetermined depth within the surface which is greater than or equal to the predetermined depth of material. The substantially cylindrical section of each of the plurality of recesses extends along an axis substantially perpendicular to the surface of the product. During an abrasion step, material is removed from the surface of the semi-finished product to a depth less than or equal to the predetermined depth. Accordingly, regardless of the specific depth of material removed from the surface proximate the plurality of alveoli, the respective contours of the alveoli with the surface remain substantially the same. The semi-finished product is adapted to be used in the manufacture of a finished product such as a golf club head or a golf club handle.

31 Claims, 5 Drawing Sheets

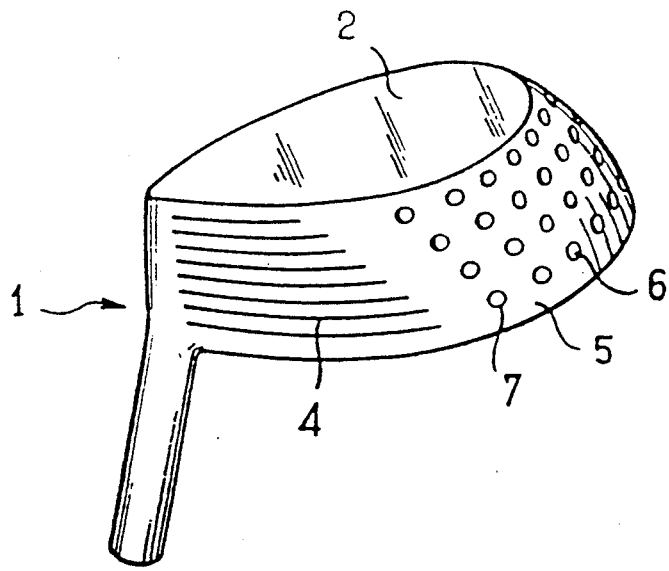
FIG_1
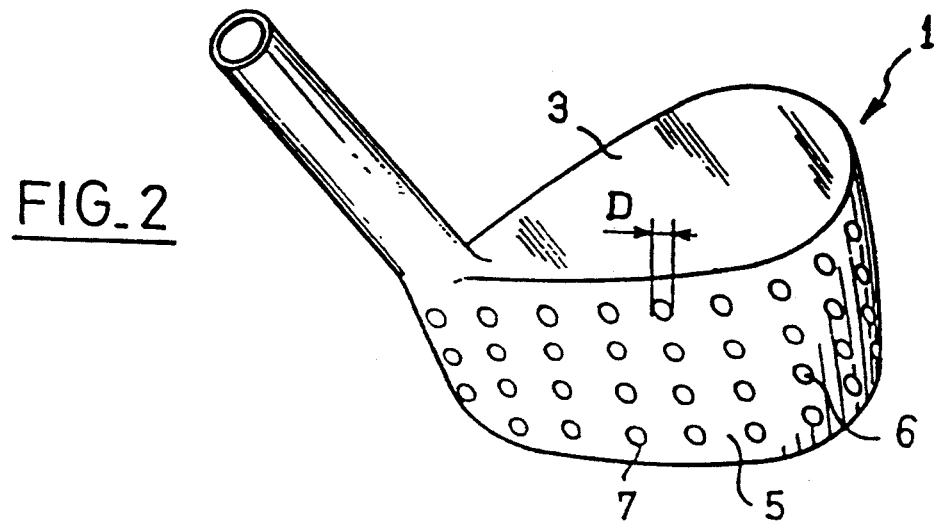
FIG_2
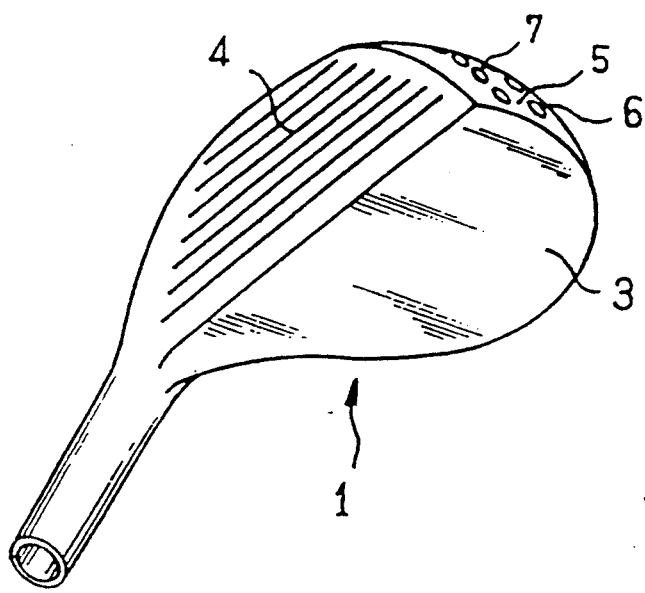
FIG_3

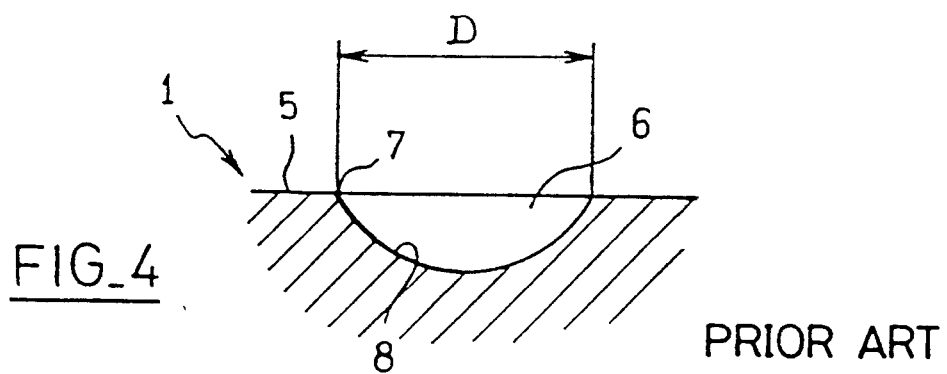
FIG. 4 PRIOR ART
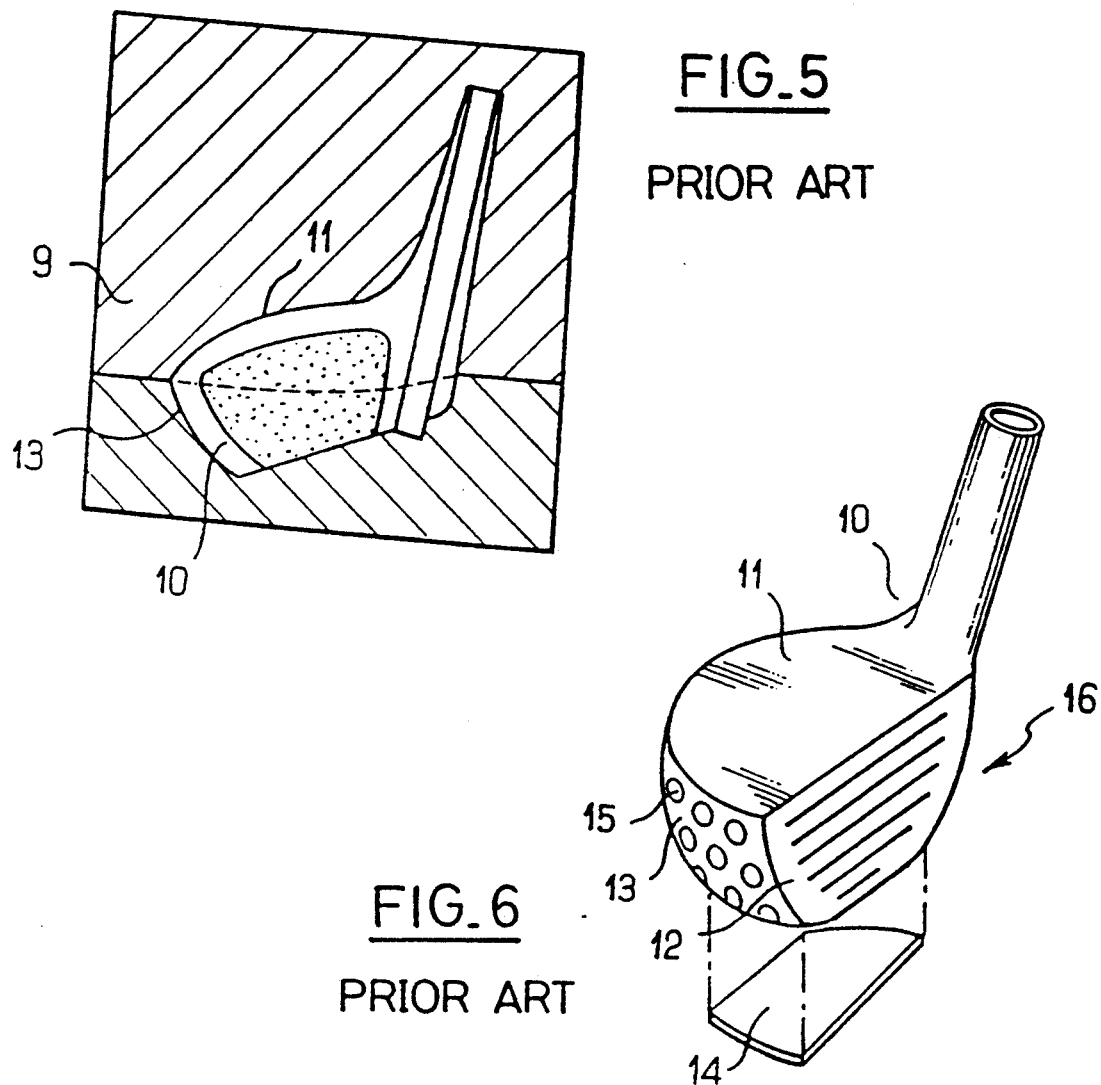
FIG. 5 PRIOR ART
FIG. 6 PRIOR ART

FIG_7 PRIOR ART
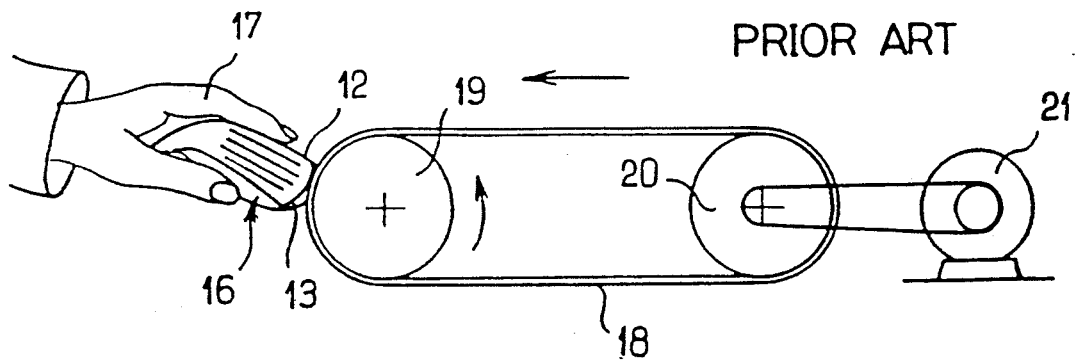
FIG_8 PRIOR ART
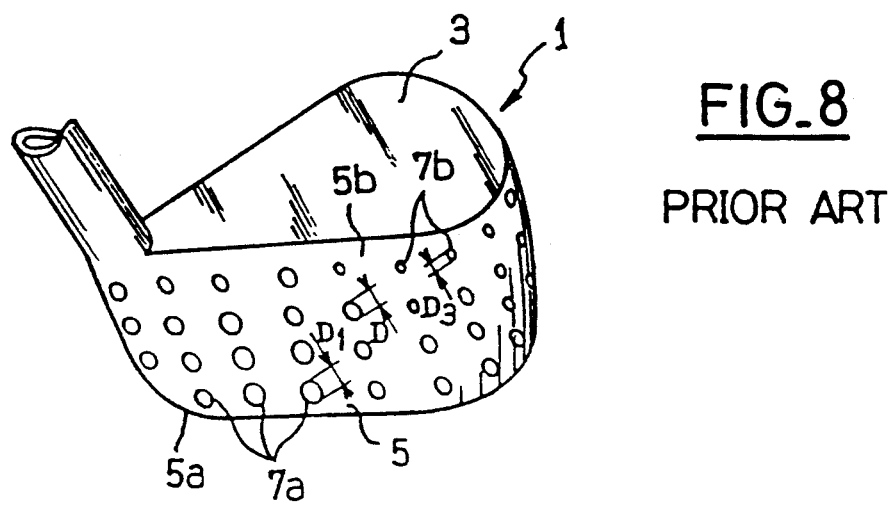
FIG_9 PRIOR ART
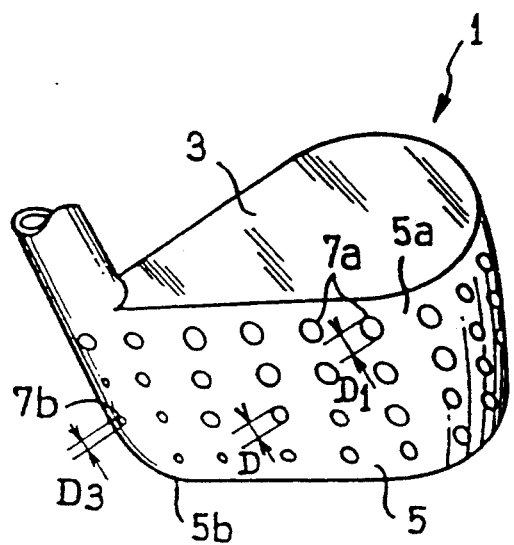

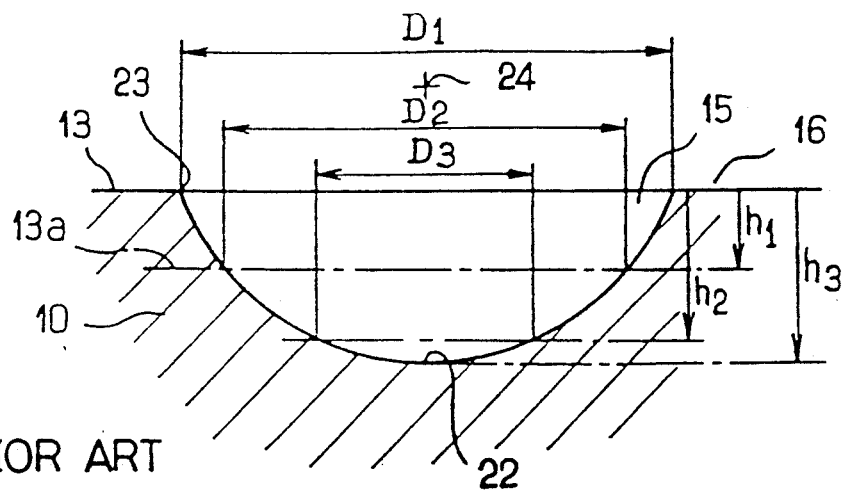
FIG_10 PRIOR ART
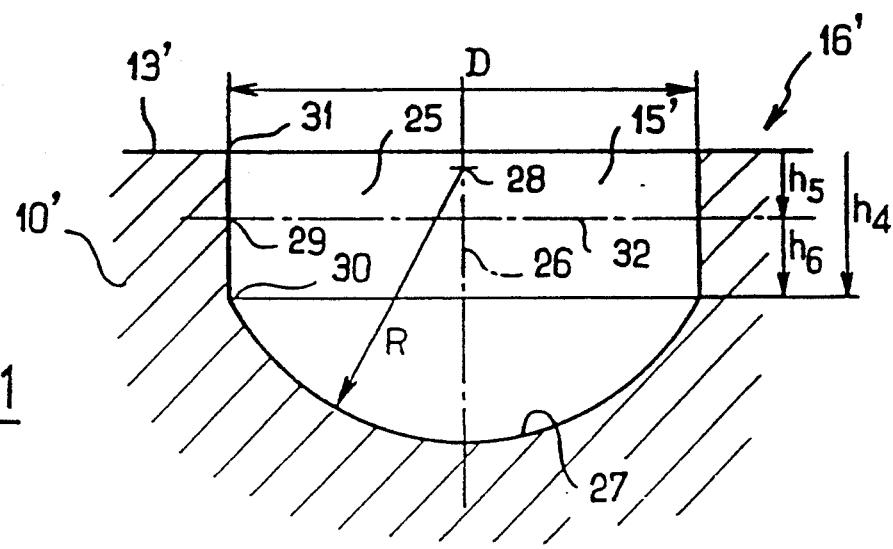
FIG_11
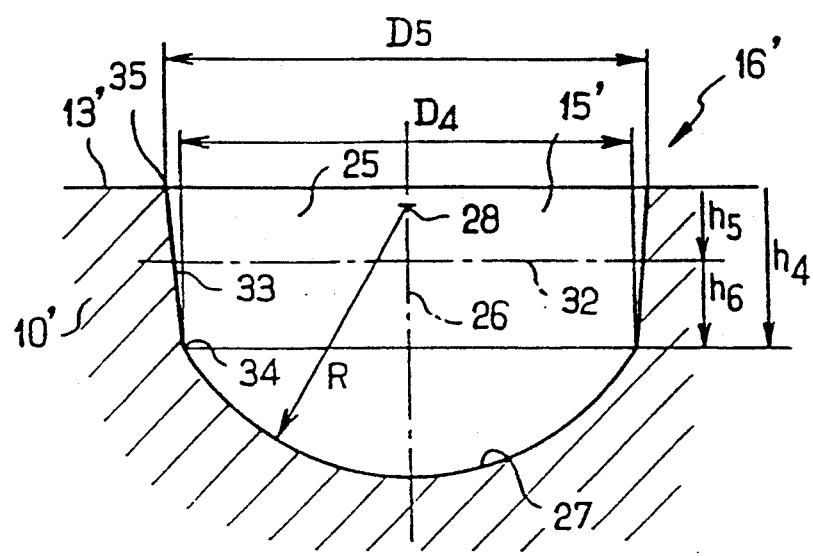
FIG_12

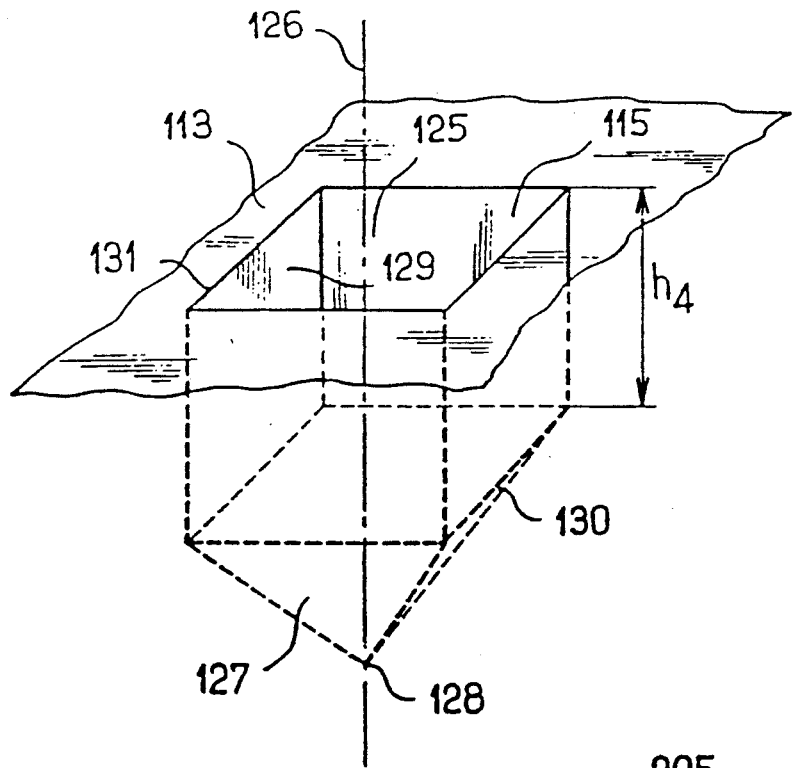
FIG_13
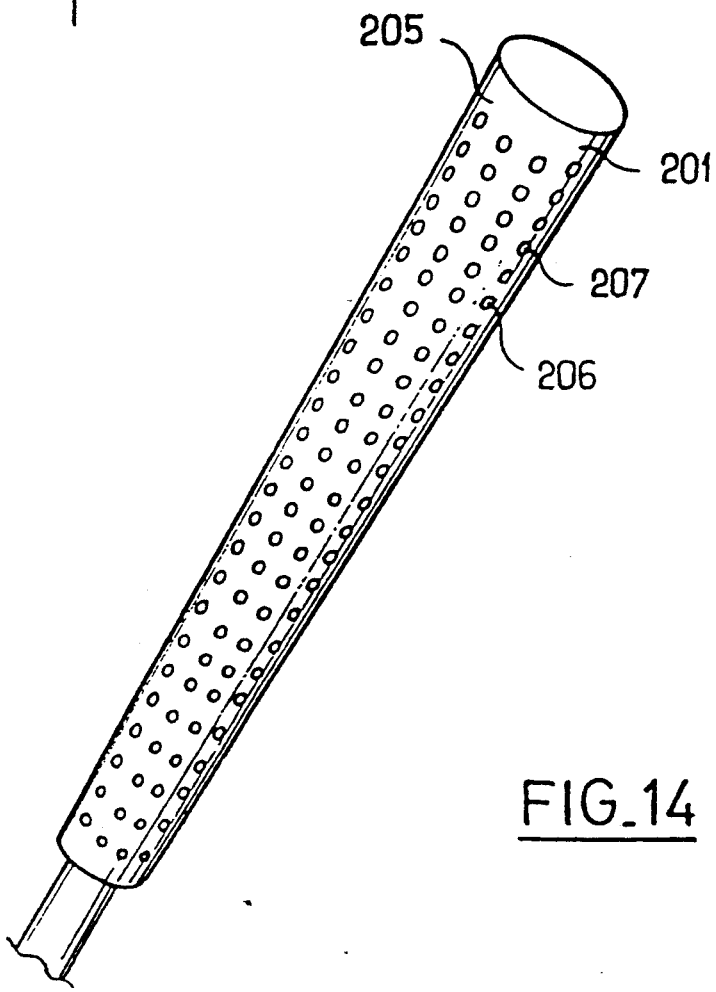
FIG_14

PRODUCT HAVING ALVEOLI, SEMI-FINISHED PRODUCT THEREFOR AND METHOD OF MAKING THE PRODUCTS

BACKGROUND OF THE INVENTION

1. Field of the Invention

The present invention relates to a process for creating a finished product and semi-finished product having at least one surface containing a plurality of alveoli; a semi-finished product produced for the implementation of the process; and the finished product obtained by the implementation of the process.

2. Description of Background and Other Information

In the production of products of the aforementioned type, the alveoli, recesses or dimples, in the surface of the rough, or pre-worked, object to be finished most often have a spherical contour whose respective junctions with the corresponding surface of the finished product, and with the surface of the rough form of the semi-finished product, has a circular contour. Significantly, an identical circular contour for all of the alveoli of the finished product is generally sought. That is, it is desired that they all have the same diameter and, preferably, the same depth with respect to the corresponding surface of the product.

To that effect, generally the alveoli of the respective rough object are generally given an identical shape, i.e., they are given the same particular contour, with the same diameter, at their junction with the corresponding rough surface on the semi-finished product, as well as an identical depth with reference to the rough surface of the semi-finished product.

Then, the rough surface is machined by grinding, sanding or polishing, i.e., in a manner that is constituted by removal of material, most often by taking the semi-finished product in hand insofar as there is no surface of reference which can be used which would permit machining with a machine tool.

The manual nature of this type of finishing has the result that a more or less significant depth of material is removed from the zones of the rough model surface, having rough forms of the alveoli, so that, depending upon whether the removal of material is carried out to a more or less significant depth, there exists on the finished product alveoli having spherical segments of variable depth and having variable diameters at the level of their circular junctions with the corresponding surface of the finished product, resulting from a more or less deep machining around the different alveoli which, initially, had been identical.

As a result of known processes for producing products having dimpled surfaces, i.e., surfaces containing recesses or alveoli, the finished products tend to have an irregular appearance which is not aesthetically appealing. In addition, there is the result that each product is aesthetically different from the others. In general, the products appear inelegant and poorly finished, whereas, on the contrary, their appearance results from a particularly careful finishing, by hand. In the case of sporting equipment, this can also result in a disadvantageous effect on the performance of such equipment.

SUMMARY OF THE INVENTION

It is an object of the present invention to overcome the problems and disadvantages mentioned above. To this end, the present invention includes a method of making a finished product, as well as a semi-finished product for making the finished product, in which the semi-finished product includes at least one surface having a plurality of recesses, or alveoli, therein, in which the method comprises:

(a) determining a depth of material to be removed from the surface during a finishing process; and (b) forming each of the plurality of recesses in the surface to have a substantially cylindrical section which extends for a predetermined depth within the surface which is greater than or equal to the depth of material determined in step (a).

According to a particular aspect of the present invention, each of the plurality of recesses has a substantially cylindrical section which extends along an axis substantially perpendicular to the surface of the product.

By way of non-limiting examples, the semi-finished product is adapted to be used in the manufacture of a finished product selected from the group consisting of a golf club head and a golf club handle.

By means of the present invention, a finished product is made by removing material from the surface such as by abrasion, including sanding, grinding, or polishing.

During the step of abrasion, material is removed from the surface of the semi-finished product to a depth less than the depth of material determined in step (a).

More particularly according to the present invention, a process is provided for creating a finished product having at least one finished surface with a plurality of finished alveoli, each of the alveoli having, at a junction with the at least one finished surface, a respective finished contour having a respective shape and dimensions determined by a succession of steps comprising:

(a) creating a semi-finished product having a rough surface made of a predetermined material, the rough surface corresponding to the at least one finished surface, provided with respective rough alveoli corresponding to the finished alveoli, and (b) machining the rough surface by removal of a portion of the material at areas of the rough surface containing the rough alveoli for creating the finished product, wherein prior to step (a), the process comprises estimating a probable maximal depth of the material to be removed by the step (b), wherein the step (a) further comprises creating each of the respective rough alveoli to include a concave bottom and a substantially cylindrical zone positioned around an axis locally substantially perpendicular to the rough surface, wherein the bottom and the substantially cylindrical zone have respective contours perpendicular to the axis substantially identical to the respective finished contour, wherein the substantially cylindrical zone connects the bottom and the rough surface and comprises, along the axis, a depth substantially equal to the probable respective maximal depth of the material to be removed.

According to a particular aspect of the present invention, the step of creating each of the rough alveoli comprises creating respective contours of each of the rough alveoli to be substantially identical.

According to a further particular aspect of the present invention, the step of creating each of the rough alveoli comprises creating each of the rough alveoli to have a substantially identical probable maximal depth.

According to a still further aspect of the present invention, the step of creating each of the rough alveoli comprises creating respective contours to be circular and creating respective bottoms to have the shape of a substantially spherical segment centered on the axis.

Still further according to the present invention, the step of creating each of the rough alveoli comprises creating respective contours to be polygonal and creating respective bottoms to have the shape of a pyramid centered on the axis.

The present invention also includes the semi-finished product as well as the finished product made according to the process.

BRIEF DESCRIPTION OF THE DRAWINGS

Other characteristics and advantages of the present invention will become apparent from the description below, which is given by way of a non-limiting mode of implementation, with reference to the annexed drawings which form an integral part of this description.

FIGS. 1-3 show perspective views of a golf club head, by way of non-limiting example of the finished product capable of being created in conformance with the present invention, i.e., having alveoli distributed on one of its surfaces;

FIG. 4 shows, in a sectional view through a plane locally perpendicular to the surface of the product, the shape of one of the alveoli when it is created by a process of the prior art;

FIGS. 5 and 6 illustrate, in perspective views, two successive steps of creation of a semi-finished product, i.e., of an unfinished form of a golf club head, in conformance with the process known in the prior art;

FIG. 7 illustrates the manual machining of the aforementioned unfinished form made in conformance with the prior art process;

FIGS. 8 and 9 show, in perspective views, two examples of a golf club head obtained by the prior art process and having characteristic defects as a consequence thereof;

FIG. 10 shows a rough alveolus of a rough form of a golf club head created and then machined in conformance with the prior art process, in sectional view through a plane locally perpendicular to the corresponding surface of the rough form of a golf club head;

FIGS. 11 and 12 show, in views similar to that of FIG. 10, two embodiments of a rough alveolus on a rough form of a golf club head created in conformance with the present invention, by way of a semi-finished product;

FIG. 13 shows, in perspective view, another version of a rough alveolus, adapted to the embodiment of an alveolus having shapes different from the form which appears in FIGS. 1-3; and FIG. 14 shows, in perspective view, a golf club handle by way of non-limiting example of a finished product capable of being created in conformance with the present invention.

DETAILED DESCRIPTION OF THE PREFERRED EMBODIMENTS

The present invention overcomes the disadvantages mentioned above, with regard to known processes and products produced thereby, by means of a particular process making it possible to create substantially identical alveoli, even in the event that the depth of removal of material from the surface of the rough form of the object to be finished during machining varies slightly from one zone of the rough object surface to another.

The process of the present invention in which a finished product is produced having a surface with a plurality of alveoli, each of which presents, at its junction with the surface, a respective contour of a respective shape and dimensions substantially predetermined, includes the succession of steps comprising:

(a) creating a semi-finished product comprising a rough surface, provided with respective rough forms of the alveoli, then (b) machining the rough surface by removal of material to achieve the finished product.

The present invention also is directed to a semi-finished product for the implementation of the process, as well as a finished product capable of being obtained by implementation of the process.

By way of a non-limiting example of a finished product capable of being produced by the present invention, a golf club head is contemplated on certain surfaces of which, other than its striking surface which is adapted to come into contact with a golf ball, alveoli are provided for aesthetic reasons. A semi-finished product, which is generally metallic, is created by molding, resulting in the rough forms of the surfaces furnished with respective rough forms of the alveoli, then the product is manually refinished by abrasion on the one hand, to eliminate any burrs or other traces of molding and, on the other hand, to ensure a desired distribution of the masses.

By way of another non-limiting example, a golf club handle is contemplated which has alveoli on its surfaces adapted to come into contact with the hand of the player, which improves the grip and comfort. The handle is produced by the manufacture of a semi-finished product, preferably molded from plastic material, and the rough form of the surfaces is provided with rough forms of the alveoli. The rough object surfaces are then manually finished by abrasion to eliminate any trace of molding. When, in a preferred manner, an expanded plastic material is used for the creation of the handle, which is covered with an impervious skin during molding, this finishing operation also has the objective of eliminating the skin covering.

In view of the above, the process according to the invention is characterized in that there is estimated, prior to stage (a) mentioned above, a probable maximal respective depth of machining of the rough object surface by removal of material at the level of each rough alveolus form, and in that each of the rough alveolus forms is created, during step (a), in the form of a recessed hole having a concave bottom and a substantially cylindrical section, the axis of which is substantially locally perpendicular to the rough object surface, the bottom and the zone having a contour substantially identical to the respective contour generally perpendicular to the axis and the zone connecting the bottom to the rough object surface and having, along the axis, a depth substantially equal to the probable respective maximal depth.

Thus, it is easily understood that the machining by removal of material is only performed, with respect to each rough alveolus, at the substantially cylindrical zone thereof so that, after machining, each of the alveoli obtained presents the same respective contour at its junction with the corresponding surface of the finished product, whatever the depth to which the material was removed around each rough alveolus within the limits of the probable respective maximal depth.

The term "cylindrical", as used herein, is be considered in a broad sense, including the reference to any volume defined by a straight line generally parallel to the axis of the rough alveolus considered and moving along the respective contour. In particular, this contour can be circular, and the bottom of each recessed hole can have the shape of a substantially spherical segment centered on the axis of the rough alveolus, and the substantially cylindrical zone of the rough alveolus is substantially cylindrical in revolution about its axis. However, contour of the "cylindrical" zone can also have any other shape, including, for example, a polygonal shape, regular or not, and the bottom of each recessed hole can have the shape of a pyramid centered on this recessed hole.

Further, the phrase "substantially cylindrical" should be understood not only as a strictly cylindrical shape such as just described, but also as a shape differing from a cylindrical shape only by a slight flaring towards the rough object surface having rough alveoli, for example, within the limits that a visually inferior product would not result. More specifically, for an embodiment having rough alveoli produced through molding by means of elements inserted in a molding cavity for the finished product, then withdrawn from these elements, according to a process known per se in the art of molding, the "substantially cylindrical" zone of the alveoli can be such that, after machining to a more or less significant depth within the limits of the probable maximal depth, the surface of the finished product does not result in having a visually substantial difference in the dimensions of the contour of the different alveoli at their junction with the corresponding surface of the finished product.

Insofar as the implementation of the process according to the invention results in the creation of a semi-finished product original in itself, the present invention extends likewise to this semi-finished product, comprising at least one rough object surface provided with rough alveoli, wherein each rough alveolus is constituted by a recessed hole having a concave bottom and a substantially cylindrical axis zone locally substantially perpendicular to the rough object surface, the bottom and the zone substantially having a single respective contour perpendicular to the axis, and the zone connecting the bottom to the rough object surface and having, along the axis, a depth substantially equal to a probable respective maximal depth of machining of the rough object surface by removal of material.

Insofar as the implementation of this process also results in the obtaining of a finished product distinguished from products of the prior art not only by great conformance of shapes and dimensions of respective contours of the alveoli at their junction with the corresponding surface of these products, in comparison with the desired contours, but likewise by the presence, in each alveolus or in certain alveoli, of a remainder of the zone which is substantially cylindrical of the corresponding rough model, the present invention extends likewise to a finished product comprising at least one surface provided with a plurality of alveoli, each of which has, at its junction with the surface, a respective contour of shape and respective dimensions substantially predetermined, and wherein each alveolus is constituted by a recessed hole having a concave bottom and a substantially cylindrical section, the substantially cylindrical section having an axis substantially locally perpendicular to the surface, the bottom and the substantially cylindrical zone having substantially the same respective contour perpendicular to the axis, and wherein the substantially cylindrical zone connecting the bottom to the surface having, along the axis, a depth between a value of zero and a value substantially less than the respective dimensions of the aforementioned contour perpendicular to the axis.

Naturally, the present invention can find application not only in the embodiment of golf club heads and handles, but also in the embodiment of numerous other finished products having alveoli as an aesthetic or other objective, particularly in a surface whose finishing is achieved by removal of material, and more particularly when this removal of material is achieved, whereas the corresponding semi-finished product is held in hand, i.e., without using a reference surface permitting a machining by means of a machine tool.

With reference to the drawings, FIGS. 1-3 will be referred to initially, where there is illustrated a head 1 of a golf club having in particular a sole piece 2 turned downwardly during the impact of head 1 against a ball, an upper surface 3, with respect to the position of the head during impact with the ball, a striking surface 4 adapted to strike the ball and mutually, locally joining the sole piece 2 and the upper surface 3, and a peripheral surface 5 mutually joining the sole piece 2 and the upper surface 3 in addition to the striking surface 4. For an aesthetic purpose, for example, the peripheral surface 5 is provided with a plurality of alveoli 10 positioned according to a predetermined motif but freely selected and having at their junction with surface 5 respective contours and respective substantially predetermined dimensions, namely, in the non-limiting example illustrated, having circular identical contours 7, i.e., of a single diameter D.

Prior to the present invention, and as FIG. 4 shows, it has been preferable to embody such alveoli 6 having the same circular contour 7 at their junction with the peripheral surface 5 of the golf club head 1 by giving them strictly a concave spherical segment 8, which leads to great difficulties in obtaining contours 7 strictly identical if a prior art method of creating a golf club head 1 is employed, and which will be reviewed with regard to FIGS. 5-7.

In the course of a first step of this manufacturing process, illustrated in FIG. 5, there is created by molding, in a mold 9 formed from an assembly of several parts, a rough form 10 of the golf club head, having rough forms 11, 12, 13, respectively, of surfaces 3, 4, 5 but not comprising the sole piece 2 which, as FIG. 6 shows, is then solidly joined, in the form of a rough form 14, to rough form 10 of the golf club head after removing the latter from the mold.

During the molding step illustrated in FIG. 5, and by virtue of an appropriate design of mold 9, there are created in rough form 13 of surface 5, rough alveoli 15, one of which is more particularly visible in FIG. 10 and which, when it involves creating alveoli 6 having a spherical segment 8, has itself the shape of the spherical segment 22. When the alveoli 6 must be identical and their contour 7 at their junction with the surface 5 of the golf head 1 must be circular and of the same diameter D, the rough forms 15 are themselves identical and each one of them has at its intersection with rough form 13 of surface 5, a circular contour 23, of the same diameter D greater than diameter D of contour 7, having a value which results from the final machining operation by removal of material, that is practiced on the semi-finished product 16 resulting from the mounting of the rough form 14 of the sole piece on the rough form 10 of the golf club head illustrated in FIG. 10.

In the course of this machining operation, illustrated in FIG. 7, the semi-finished product 16 is taken in the hand 17 to present particularly the rough form 12 of the striking surface and the rough form 13 of the peripheral surface, to a movable sanding belt 18, shown, for example, in the form of a continuous belt circulating over itself about two rollers 19, 20, of which one is rotated by a motor 21, to eliminate by sanding any trace of molding, for example, burrs resulting from the junction between the different parts of the mold 9 and the traces of molding sprues appropriately sectioned beforehand, in a manner not shown, but well known to those being ordinarily skilled in the art. This operation can also serve to carefully balance the masses in head thus manufactured.

Naturally, the machining operation by removal of material illustrated in FIG. 7 can be practiced by means other than a continuous sanding belt 18, and, for example, by means of a rotary grinding wheel, or by any other means proper for carrying out grinding, sanding, or polishing, or by a successive presentation of the semi-finished product 16 to different proper means to ensure an even finer finishing, to result in the desired finished product, namely, in the preferred embodiment shown, golf club head 1.

In the rough form 13 of peripheral surface 5 of the head 1, the removal of material resulting from the operation illustrated in FIG. 7 results, at the area of each rough form 15 of alveolus 6 into a reduction in the diameter of its contour 16 at its junction with the rough object surface 13 as FIG. 10 shows. In fact, because of the spherical segment 22 of rough alveolus form 15, given that the center 24 of the sphere corresponding to the spherical segment 22 is offset towards the exterior of the rough alveolus form 15 with respect to the rough object surface 13, the removal of material about a determined rough alveolus form 15, over a depth $h_1$ perpendicular to surface 13, to bring the latter to a level 13a, translates into a reduction in the diameter of contour 23 from value $D_1$ to a value $D_2$, and the removal of material over a depth $h_2$ defined as $h_1$ but greater than $h_1$ translates into the passage from the diameter of contour 23 to an even lower value $D_3$.

Naturally, it is with respect to diameter D to be obtained and a probable depth for removal of material that the diameter $D_1$ of contour 23 of rough alveolus form 15 is calculated at its junction with rough object surface 13, such that after the machining operation illustrated in FIG. 7, the diameter of the junction of the alveolus and the object surface is changed from $D_1$ to diameter D, which was actually selected.

However, it can be observed that a small difference between the actual depth of machining about a determined rough alveolus form 15 and the depth estimated as a function of which diameter $D_1$ was selected, can lead to a significant difference between the diameter actually resulting in contour 7 of the corresponding alveolus 6 and the desired diameter D. Thus, for example, if $h_1$ corresponds to the machining depth with respect to which diameter $D_1$ was determined, so that after a removal of material over this depth $h_1$, the diameter of contour 23 of rough model 15 is brought to a value $D_2$ equal to the desired value D, it is possible that the depth for removal of material about the concerned rough alveolus form 15 be carried out over the depth $h_2$ instead of depth $h_1$ so that alveolus 6 has a contour 7, the diameter $D_3$ which is much less than $D_2$, and it is also possible that rough object surface 13 be only slightly modified by the removal of material about the rough alveolus 15 so that contour 7 of alveolus 6 obtained has the diameter $D_1$ greater than the desired diameter D.

Such disadvantageous results are very likely during the finishing process heretofore known if it is taken into account that the semi-finished product 16 is held by hand 17 during the machining by removal of material and, naturally, the probability is significant that these results appear in various degrees in different areas of the rough object surface 13, with the consequence that the peripheral surface 5 of the finished golf head 1 is relatively unsightly with irregular alveoli 6.

FIGS. 8 and 9 show typical examples of irregularities in the appearance of the alveoli 6 obtained. Whereas these alveoli 6 should have an identical contour 7, i.e., with the same predetermined diameter D, the contour 7a of certain alveoli, localized in zones 5a of surface 5, have a diameter greater than D, for example, equal to $D_1$, these zones 5a constituting in fact the remainders of the rough object surface 13, whereas the contours 7b of alveoli located in the other too greatly machined zones 5b of surface 5 have a diameter much less than diameter D, and for example, equal to $D_3$. The diameters of the contours of the alveoli vary in the sense of a progressive decrease of the alveoli located in the zones 5a towards the alveoli located in zones 5b by going through the desired value D at the level of some alveoli localized between zones 5a and 5b. At the very most, in certain zones 5b, the removal of material can reach a depth greater than an initial depth $h_3$ of the rough alveolus forms 15, measured locally perpendicular to the rough surface model 13, in which case any trace of alveolus disappears in these zones.

FIGS. 8 and 9 show how an unattractive golf club head 1 can thus be created.

To overcome this disadvantage, the present invention presents a solution illustrated in FIGS. 11 and 12 with regards to the manufacture of a golf club head 1 described with reference to FIGS. 1-3, i.e., a golf club head having on a peripheral surface 5 with alveoli 6 having at their junction with peripheral surface 5, respective substantially circular contours, of the same diameter D. The present invention can find further application in the case of any other contour shape, and in any case, where one desires that the contours have identical dimensions or different dimensions as soon as they are determined.

In conformance with the present invention, one begins by creating, for example, by a process similar to that which was described previously, comprising successively molding a rough form of head 10' and mounting the rough form of a sole piece 14 on the rough form of head 10', a semi-finished product 16'. The semi-finished product 16' is similar to the semi-finished product 16 which was described by way of illustration of the prior art, with the exception that each rough alveolus form 15' of the present invention does not merely have the shape of a spherical segment 22 as described more particularly with reference to FIG. 10, but a shape characteristic of the present invention and which will be described presently with reference to FIGS. 11 and 12.

In one case or another, the rough alveolus form 15' has the shape of a recess 25 provided in the surface 13' of the rough form of head 10' extending along a respective axis 26 locally perpendicular to the rough surface 13'.

This recess 25 has, in particular, a concave bottom 27 which, in this non-limiting embodiment of the invention, has the shape of a substantially spherical segment having a center 28 and a respective axis 26 and, with reference to center 28, a radius R much greater than half of diameter D that the corresponding alveolus 6 must have at its junction with the peripheral surface 5 of the golf head 1. In the example illustrated in FIG. 11, the recess 25 also has a cylindrical zone 29 positioned around axis 26 with a diameter equal, to diameter D. The cylindrical zone 29 extends from junction 30 with the bottom 27 of recess 25 as far as the rough surface 13' and, thus, has at its junction 30 with the bottom 27, as well as at its junction 31 with the rough surface 13', and, further, at any plane 32 perpendicular to axis 26, an identical contour, in shape and dimensions, to contour 7 that the corresponding alveolus 6 must have at its junction with the peripheral surface 5 of the golf head 1.

In the case of the example illustrated in FIG. 12, in zone 29 a zone having the form of a truncated cone 33 of revolution about axis 26 is substituted which flares from a junction 34 with the bottom 27 towards a junction 35 with the rough surface 13', of a magnitude just sufficient to permit an easy creation of the recess 15' by molding, during a step similar to that which was described with reference to FIG. 5, by virtue of means easily determinable by one with ordinary skill in the art. Zone 33 thus has at its junctions 34 and 35, respectively, with bottom 27 and with rough surface 13', circular contours having respective diameters and $D_4$ and $D_5$ approximately equal to one another and to diameter D of contour 7 of alveolus 6 to be created, so that one can consider with good approximation that the zone 33 is cylindrical in revolution about axis 26 with a diameter equal to D. In the same way, in any plane of section 32 perpendicular to axis 26, zone 33 has a circular contour of diameter certainly intermediate between diameters $D_4$ and $D_5$, but approximately equal to diameter D.

In case of the embodiment of either FIG. 11 or FIG. 12, it can be observed that the fact that the bottom 27 has, with reference to center 28, a radius R substantially more than half of D, ensures a junction between the bottom 27 and the zone 29 or 33 of recess 25, namely, junction 30 or 34, in the form of a circle perpendicular to axis 26 and centered thereon.

In the two examples illustrated, i.e., in FIGS. 11 and 12, the junctions 30 and 34 of bottom 27 of recess 25 with the cylindrical zone 29 and substantially cylindrical 33, respectively, of the recess are located, with respect to rough surface 13', at a depth $h_4$, measured along axis 26, substantially equal to the expected maximal depth of machining of the rough surface 13' about the rough alveolus 15' shown in FIGS. 11 and 12. Importantly, this is true for each alveolus of the finished product. Naturally, depending upon whether it is probable that the rough surface 13' is to be machined, by removal of material, over a depth substantially uniform or over a depth varying substantially depending upon its particular zones, the value $h_4$ can be respectively identical for all rough alveoli 15' or, alternatively, different from one rough alveolus 15' to another. That is, the value $h_4$ can be made greater to the extent that the maximal depth of probable machining is determined to be greater.

As a result, an initial phase in the production of the embodiment of a head 1 for a golf club according to the present invention consists of designing the general shape of the rough form 10' of the head and estimating, at least concerning each of the zones of rough surface 13' corresponding to the peripheral surface 5 of the head 1 which is to have the alveoli 6, whatever the probable respective maximal depth of machining by removal of material, based particularly upon the probable positioning of the burrs resulting from the molding and the casting sprues.

Then, the rough form 10' is created, having on the rough surface 13' corresponding to surface 5, rough alveoli 15', created with respect to the aforementioned estimation either in conformance with FIG. 11 or in conformance with FIG. 12 and the rough form of sole piece 14 is then affixed to the rough form of head 10' thus designed, for example, by the succession of the steps described with reference to FIGS. 5 and 6.

Later, the machining operation by removal of material described with reference to FIG. 7 is carried out, or a similar operation, resulting in a removal of material over a depth which is more or less significant at each rough alveoli 15', however, within the limits of the respective corresponding value $h_4$, if the latter has been correctly estimated.

Under these circumstances, if at the rough alveolus 15' illustrated in FIG. 11 or in FIG. 12, the aforementioned machining operation results in almost no removal of material, the peripheral surface 5 of head 1 practically matches the rough surface 13' and the alveolus 6 obtained itself substantially matches with its rough form 15', of which it retains the bottom 27 and the zone 29 (FIG. 11) or 33 (FIG. 12) practically in its entirety, i.e., over a depth substantially equal to its original depth $h_4$. Consequently, the alveolus 6 obtained has at its intersection with surface 5, a contour practically coinciding with the contour 31 (FIG. 11) or 35 (FIG. 12), i.e., a circular contour of a diameter respectively equal to D, or equal to $D_5$, whose difference with respect to D is visually imperceptible. If the depth of removal of material, measured parallel to axis 26 with reference to the rough surface 13', is carried out over an intermediate depth $h_5$ between 0 and the probable maximal depth $h_4$, which places the peripheral surface 5 and its intersection with alveolus 6 at the level of plane 32, the diameter of this contour remains circular, and of a diameter respectively equal to D (FIG. 11) or at an intermediate value between $D_4$ and $D_5$, and visually approximately equal to D (FIG. 12). The alveolus 6 obtained then has the shape of a recessed hole defined, on the one hand, by the bottom 27 and, on the other hand, by a section, immediately adjacent to the bottom 27, of the zone 29 (FIG. 11) or 33 (FIG. 12) over a depth $h_6$ equal to the difference between $h_4$ and the actual depth of machining $h_5$, parallel to axis 28. If, at rough alveolus 15' considered, the depth of machining reaches the maximal depth $h_4$, the previously cited section of the zone 29 or 33 disappears totally or, in other words, has a depth of 0 parallel to axis 26 and the contour 7 of alveolus 6 merges with the circular junction 30 or 34 of zone 29 or 33 of rough alveolus 15' with the bottom 27, i.e., has a circular shape of diameter equal to D (FIG. 11) or to $D_4$ visually approximately equal to D. Only the bottom 27 would then define the alveolus 6.

Naturally, the same aforementioned phenomenon occurs at the areas of the other alveoli 15' on the rough surface 13' so that, even if the rough surface 13' is machined over different depths about these different rough alveoli, the respective contours 7 of the different alveoli 6, which results on the finished head 1, has, at least in appearance, substantially the same diameter D which is sought, with a particularly aesthetic result. The depth $h_4$, and with it the depth of the section 29 or 33 which can exist after finishing, can generally be kept sufficiently small, in comparison with the diameter D, so that the possible existence of a section 29 or 33 in certain alveoli 6 remains practically visually indiscernible.

As a consequence of the present invention, the machining process by which material is removed to achieve the finishing of the semi-finished product 16', particularly at the area of the rough surface 13' of the rough form of head 10', is relatively immaterial as to the achievement of the improved results of the present invention. The machining process can consist of any material removal process whatsoever, it being understood that the present invention more particularly finds its application in the creation of products offering no reference surface with regard to the implementation of such a machining process, so that the latter is generally practiced by abrasion and particularly by grinding, sanding or polishing, in which the semi-finished product is held by hand. However, creating rough alveoli on a finished product adapted to be machined by a machine tool as indicated, would not go beyond the scope of the present invention.

In the same way, although the present invention has been described in the case of an embodiment of alveoli having circular contours at their junction with the corresponding surface of the finished product, alveoli could also be embodied in conformance with the present invention whose contour thus defined would have a shape different from a circular shape and, for example, would have a polygonal shape.

FIG. 13 illustrates a rough form 115 of an alveolus adapted to have a squared shape at its contour at the junction with the corresponding surface of the finished product.

To that end, the rough form of alveolus 115, provided in a rough surface 113 adapted to be machined by removal of material, has the shape of a recess 125 provided along an axis 126 locally perpendicular to rough surface 113.

The recess 125 includes a pyramidal bottom 127 having an apex 128 on axis 126 and, between the apex 128 and surface 113, a squared bottom contour 130, centered on axis 126, parallel to the rough surface 113 and located at a depth $h_4$ thereof, measured parallel to axis 126, which depth $h_4$ is calculated as was indicated above, with reference to FIGS. 11 and 12, with respect to an estimated probable maximal machining depth of the rough surface 113 around the rough alveoli 115.

From its bottom 127 to the rough surface 113, the recess 125 has a cylindrical zone 129 around axis 126, i.e., zone 129 is defined by generating lines parallel to axis 126 and resting on the contour 130 such that the zone 129 of the recess 125 joins the rough surface 113 according to a contour 131 identical to contour 130, i.e., squared, centered on axis 126 and having the same dimensions as contour 130.

Contours 130 and 131 are selected to be identical to the contour that each alveolus must have at its junction with the corresponding surface.

It is easily understood that in this case, as in the embodiments described above, a machining of the rough surface 113 by removal of material over the entire depth between 0 and $h_4$, measured parallel to axis 126, makes it possible to convey to the alveolus obtained a contour identical to the contours 130 and 131, at its junction with the corresponding surface of the finished product.

Naturally, as the embodiment of FIG. 12 can be considered as an alternative of the embodiment to FIG. 11, the embodiment of FIG. 13 could be subjected to an alternative embodiment according to which the cylindrical zone 129 of the recess 125 would be replaced by a zone which diverges from the bottom 127 in a sufficient manner to permit the creation of the recess 125 by molding, but diverging in a sufficiently small enough so that the difference in dimension which would result between the contours 130 and 131 is almost visually indiscernible.

In the same way, the golf club head 1 illustrated in FIGS. 1–3 does not constitute the only finished product capable of being achieved according to the present invention. For example, as shown in FIG. 14 there is illustrated, by way of another non-limiting example, a product capable of being achieved in conformance with the present invention. Specifically, a handle 201 for a golf club is shown which is created by the molding of a rough form of plastic material and, then, the machining of the rough form by removal of material, by a process of abrasion selected from a group comprising grinding, sanding, and polishing. The handle 201 has on a peripheral surface 205, alveoli 206 whose respective junctions with the surface 205 define circular contours 207 which are mutually identical, at least in appearance, and for example, circular and substantially of the same diameter.

The implementation of the invention in view of the embodiment of such a product as shown in FIG. 14 can be easily derived, by one with ordinary skill in the art, from the preceding description. In the same way, one with ordinary skill in the art can proceed, without going beyond the scope of the present invention, to the adaptation of the process and the details which are described above in the creation of products other than those which were just described, comprising alveoli having a circular or polygonal contour or yet another contour, of identical shapes and dimensions from one alveolus to another or different from one alveolus to another, since the predetermined shapes and dimensions are maintained from the rough forms to the finished forms.

Finally, although the invention has been described with reference to particular means, materials and embodiments, it is to be understood that the invention is not limited to the particular disclosed and extends to all equivalents within the scope of the claims.

What is claimed is:

1. A semi-finished product for producing a finished golf club, the finished golf club having at least one finished surface with a plurality of finished alveoli having, at respective junctions with said at least one finished surface, a respective finished contour, the semi-finished product comprising at least one rough surface of a semi-finished golf club, said at least one rough surface being provided with respective rough alveoli, wherein each of said rough alveoli is constituted by a recess having a concave bottom and a substantially cylindrical zone positioned around an axis locally substantially perpendicular to said rough surface, wherein said concave bottom and said substantially cylindrical zone have respective contours perpendicular to said axis substantially identical to said respective finished contour, wherein said substantially cylindrical zone connects said bottom and said rough surface and comprises, along said axis, a depth substantially equal to a respective maximal depth of said material to be removed during a finishing process.

2. The semi-finished product according to claim 1, wherein said respective contours of each of said rough alveoli are substantially identical.

3. The semi-finished product according to claim 2, wherein each of said rough alveoli have a substantially identical maximal depth.

4. The semi-finished product according to claim 3, wherein each of said respective contours of said rough alveoli are circular and wherein each of said respective bottoms of said rough alveoli has a substantially spherical segment centered on said axis.

5. The semi-finished product according to claim 3, wherein each of said respective contours of said rough alveoli are polygonal and wherein each of said respective bottoms of said rough alveoli has the shape of a pyramid centered on said axis.

6. The semi-finished product according to claim 2, wherein each of said respective contours of said rough alveoli are circular and wherein each of said respective bottoms of said rough alveoli has a substantially spherical segment centered on said axis.

7. The semi-finished product according to claim 2, wherein each of said respective contours of said rough alveoli are polygonal and wherein each of said respective bottoms of said rough alveoli has the shape of a pyramid centered on said axis.

8. The semi-finished product according to claim 1, wherein each of said rough alveoli have a substantially identical maximal depth.

9. The semi-finished product according to claim 8, wherein each of said respective contours of said rough alveoli are circular and wherein each of said respective bottoms of said rough alveoli has a substantially spherical segment centered on said axis.

10. The semi-finished product according to claim 8, wherein each of said respective contours of said rough alveoli are polygonal and wherein each of said respective bottoms of said rough alveoli has the shape of a pyramid centered on said axis.

11. The semi-finished product according to claim 1, wherein each of said respective contours of said rough alveoli are circular and wherein each of said respective bottoms of said rough alveoli has a substantially spherical segment centered on said axis.

12. The semi-finished product according to claim 1, wherein each of said respective contours of said rough alveoli are polygonal and wherein each of said respective bottoms of said rough alveoli has the shape of a pyramid centered on said axis.

13. The semi-finished product according to claim 1, wherein said one rough surface comprises a surface of a part of a golf club, said part comprising a member selected from the group consisting of a golf club head and a golf club handle.

14. A finished product comprising at least one finished surface of a golf club with a plurality of finished alveoli, each of said plurality of finished alveoli having, at a junction with said at least one finished surface, a respective finished contour having a respective shape and dimensions, wherein each of said plurality of finished alveoli comprises a recess having a concave bottom and a substantially cylindrical zone positioned around an axis locally substantially perpendicular to said finished surface, wherein said concave bottom and said substantially cylindrical zone have respective contours perpendicular to said axis, wherein said substantially cylindrical zone has a predetermined width and a depth between a value greater than zero and a value substantially less than said width of said substantially cylindrical zone.

15. The product according to claim 14, wherein each of said respective contours is substantially identical to the others.

16. The product according to claim 15, wherein each of said respective contours of said finished alveoli is circular and wherein each of said bottoms of said finished alveoli has the shape of a substantially spherical segment centered on said axis.

17. The product according to claim 15, wherein each of said respective contours of said finished alveoli is polygonal and wherein each of said bottoms of said finished alveoli has the shape of a pyramid centered on said axis.

18. The product according to claim 17, wherein said one finished surface comprises a surface of a part of a golf club, said part comprising a member selected from the group consisting of a golf club head and a golf club handle.

19. The product according to claim 14, wherein each of said respective contours of said finished alveoli is circular and wherein each of said bottoms of said finished alveoli has the shape of a substantially spherical segment centered on said axis.

20. The product according to claim 14, wherein each of said respective contours of said finished alveoli is polygonal and wherein each of said bottoms of said finished alveoli has the shape of a pyramid centered on said axis.

21. The product according to claim 20, wherein said one finished surface comprises a surface of a part of a golf club, said part comprising a member selected from the group consisting of a golf club head and a golf club handle.

22. A product comprising at least one surface of a golf club, said at least one surface having a plurality of recesses therein, each of said plurality of recesses having a closed bottom and a substantially cylindrical section which extends along an axis substantially perpendicular to said surface.

23. The product of claim 22, wherein said one surface comprises a surface of a part of a golf club, said part comprising a member selected from the group consisting of a golf club head and a golf club handle.

24. The product of claim 23, wherein said plurality of recesses comprises a plurality of substantially equally spaced recesses.

25. The product of claim 23, wherein said plurality of recesses comprises a plurality of rows and columns of recesses.

26. The product of claim 23, wherein said product is a semi-finished golf club.

27. The product of claim 22, wherein said product comprises a golf club head.

28. The product of claim 27, wherein said golf club head comprises a ball striking surface, and wherein said at least one surface comprises a surface other than said ball striking surface.

29. The product of claim 27, wherein said product is a semi-finished golf club.

30. The product of claim 22, wherein said product comprises a golf club handle.

31. The product of claim 22, wherein said product is a semi-finished golf club.

* * * * *